(12) United States Patent
Ludwick et al.

(10) Patent No.: US 6,237,452 B1
(45) Date of Patent: *May 29, 2001

(54) PRECISION HIGH SPEED TURNING MACHINE

(75) Inventors: Stephen J. Ludwick, Somerville, MA (US); David L. Trumper, Plaistow, NH (US); David C. Ma, Cambridge, MA (US)

(73) Assignee: Massachusetts Institute of Technology

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,380

(22) Filed: Dec. 29, 1997

(51) Int. Cl.$^7$ .................................................. B23B 5/00
(52) U.S. Cl. ................................. 82/12; 82/118; 82/133; 82/134
(58) Field of Search ................................. 82/12, 13, 17, 82/1.5, 118, 133, 134, 904; 451/5, 6, 9, 42

(56) References Cited

U.S. PATENT DOCUMENTS

| 3,692,370 | | 9/1972 | Hasz | 308/1 |
| 4,016,682 | | 4/1977 | Legendre | 51/50 |
| 4,333,368 | | 6/1982 | Watt . | |
| 5,168,661 | * | 12/1992 | Pedersen et al. | 451/5 |
| 5,185,965 | * | 2/1993 | Ozaki | 451/5 |
| 5,195,407 | * | 3/1993 | Takeno et al. | 82/12 X |
| 5,359,814 | * | 11/1994 | Baltazar et al. | 451/5 |
| 5,367,835 | * | 11/1994 | Turnbull | 451/5 |
| 5,402,607 | * | 4/1995 | Lombard | 451/5 |
| 5,417,130 | * | 5/1995 | Dorsch | 82/12 X |

FOREIGN PATENT DOCUMENTS 0 521 598A1   7/1993   (EP) .
0 786 309A1   7/1997   (EP) .

OTHER PUBLICATIONS

Durbin, Charles E. and Martin W. Burnham. SPIF vol. 93 Advances in Precision Machining of Optics (1976), p. 32–37.

* cited by examiner

Primary Examiner—Henry Tsai
(74) Attorney, Agent, or Firm—Wolf, Greenfield & Sacks, P.C.

(57) ABSTRACT

A precision high speed turning machine apparatus is provided which performs a selected operation, such as shaping, polishing or probing/measuring on a workpiece and in particular on a rotationally non-symmetric workpiece. The workpiece is mounted to a workpiece mount which rotates the workpiece at a controlled rate, and a tool is provided which is adapted to perform the selected operation. The tool is supported on a tool mount which positions the tool adjacent a portion of a workpiece surface to be operated on. The tool mount is designed to have very low inertia which permits relatively large movements, of the tool generally perpendicular to the workpiece, at high enough accelerations so as to permit high speed rotation of the workpiece. For some embodiments, more than one tool is mounted to the arm so as to permit a plurality of different operations to be performed.

31 Claims, 10 Drawing Sheets

PRECISION HIGH SPEED TURNING MACHINE

This invention was made with government support under Grant Number 9496102-DDM awarded by the National Science Foundation. The government has certain rights in the invention.

FIELD OF THE INVENTION

This invention relates to turning machines and more particularly to high-speed, precision turning machines of a type used in producing precision components, including lenses and other precision optical components. The invention finds particular applications for operation on components having axial or rotational asymmetric variations in surface depth.

BACKGROUND OF THE INVENTION

While precision turning machines are utilized in a variety of applications, one application in which such machines are used extensively is in the manufacture of ophthalmic lenses used for the correction of various vision defects. Such lenses, which are typically manufactured from optical plastics in the United States, start with lens blanks molded with a finished front side (away from the user's eye) and a back surface (near the user's eye) which is to be shaped to the required prescription. Such shaping is typically done using either a turning, milling, or grinding process to approximate the correct lens shape. For the back surface, the amount of material removed can be substantial, a typical lens blank having a diameter of 80 mm and a thickness of 20 mm. A fining operation then removes the form error from the lens by lapping it against a master lap surface. This lapping process typically uses the equivalent of a very fine grit sandpaper. Two fining operations may be required to sufficiently eliminate the form error. The back surface is then polished to optical clarity with a felt pad and polishing compound against the master lap. Finally, the periphery of the lens is shaped to fit in the selected frame.

Since reducing both cost and response time are becoming increasingly important in the ophthalmic industry, and since capital costs and labor costs in an ophthalmic laboratory are normally fixed regardless of the number of lenses produced, a significant increase in the number of lenses which can be produced during a unit of time can result in a substantially reduced cost per lens. Further, since some optometrists having optical labs on the premises are advertising that they will provide glasses within an hour, it is necessary that the processing time for producing quality lenses be minimized. One way of accomplishing this is to reduce some of the manufacturing operations indicated above. In particular, if the part can be shaped accurately enough during the first material removal process, at least one, and preferably both, fining operations may be eliminated. The elimination of the extra fining operations not only eliminates the time and expense required for these operations, but also eliminates additional handling of the lenses, thereby further reducing both processing time and labor costs. In addition, even with only a single shaping step, it is desirable that the rate at which this step can be performed be maximized.

There is also a certain level of accuracy and surface finish which will allow even greater cost reductions in the lens production process. At present, a master hard lap is required for each prescription that a particular laboratory produces. An optical laboratory normally stores, maintains, and periodically replaces hard laps for all possible prescriptions. This may result in the storing of hundreds or even thousands of hard laps at a typical optical laboratory, resulting in a significant investment by the laboratory both in the hard laps themselves and in space for storage. Selection of the proper hard lap for a given prescription also takes time and labor, thereby adding to lab costs and reducing lab throughput. However, if the initial surface generation is precise enough, the hard laps can be eliminated and a final polishing to optical clarity can be done with a soft, conformable lap, or perhaps even with a coating.

Further, correcting astigmatism or other axial asymmetric variations in the eye requires a lens with a toric (i.e., section of a torus) or other rotationally asymmetric surface. Such lenses are more difficult to manufacture than spherical lenses because of these rotationally asymmetric surface features which require that, in a turning operation, the tool position be synchronized to the spindles angular position. Non-rotationally symmetric features such as these for precision turned parts are typically shaped by a fast tool servo. However, fast tool servos are generally used only in short travel applications involving a few hundred microns or less. Long motion is provided by a second coarse stage. Therefore, while this design can be used for components having very small asymmetric variations in depth, it is not generally an option for the production of spectacle lenses since surface feature depths can vary by 10 mm (1 cm) or more.

If an attempt is made to use the coarse stage to deal with such large variations in feature depth, then the rotational speed of the lens or other workpiece must be reduced so as to permit depth tracking by this relatively slow moving stage. However, for cutting to be achieved, a certain surface speed must be maintained between the cutting tool, for example a diamond tip, and the surface of the workpiece. If the workpiece is slowed down sufficiently to permit depth tracking by the coarse stage, then the required surface speed for cutting must be made up in other ways, generally by rotating the cutting tool. However, using a rotating cutting tool adds to the complexity and cost of the turning machine and also adds significant mass to the tool mounting assembly, further reducing the response time of this assembly. The rotation of the tool also creates a potential for vibration, the rotary motor used to rotate the tool not being a particularly stiff mount, and the rotary motor used for rotating the tool is also a source of the heat. Therefore, while the use of such rotating tool devices, with the workpiece rotating at relatively low speed, has heretofore been the preferred option for producing lenses and other components having rotationally asymmetric surface features, these techniques have been slow, costly, and have generally not been precise enough to eliminate the need for additional finishing operation.

The problems discussed above for ophthalmic lenses also apply in the manufacture of other lenses or optical components having surface features which are non-rotationally symmetric, and may also apply in the fabrication of certain non-optical, and generally opaque, components having precise, non-rotationally symmetric surface shapes, for example components formed of metals or ceramics. Such components may include, but are by no means limited to, cams and camshafts, pistons, decorative pieces, etc.

Thus, a need exists for an improved turning machine which permits precision lenses and other components which are non-rotationally symmetric to be precisely fabricated, preferably in a single shaping operation, at relatively high speed, and in particular without requiring a hard lap so as to permit the rapid, precise, low cost fabrication of such components. Such a turning machine should also be relatively simple in design, and thus easier to fabricate and of lower cost than existing machines, and also of smaller size.

SUMMARY OF THE INVENTIONS

In accordance with the above, this invention provides apparatus for performing a selected operation, such as shaping, polishing or probing/measuring, on a workpiece which may be rotationally non-symmetric. The apparatus includes a workpiece mount which mount leaves at least one surface of the workpiece exposed to be operated on. A mechanism is provided for operating on the mount to rotate the workpiece at a controlled rate, which rate may be constant or may vary depending on such factors as the portion of the workpiece surface being operated on. An indicator is also provided of workpiece rotational position. A tool adapted to perform the selected operation is fixedly supported on a tool mount which mount positions the tool adjacent a portion of the at least one surface which is to be operated on. The portion of the mount supporting the tool is movable in a direction have a component perpendicular to the surface operated on, with this portion of the mount having minimum mass, and no portion of the mount with mass significantly greater than that of such portion being movable in the direction of the perpendicular component by an amount as great as that of the tool. This results in a very low inertia structure which permits relatively large movements of the tool in the direction of movement thereof, up to 1 cm or more, at high enough accelerations so as to permit high speed rotation of the workpiece. A transducer is also provided which acts through the mount to affect a parameter (for example position or pressure) of the tool in the direction of the perpendicular component, there being substantially greater movement in the direction of the perpendicular component at the tool than at the transducer. Finally, a controller is provided for the transducer which controller is responsive in part to the indicator of workpiece rotational position.

The portion of the at least one surface which the tool is adjacent may be controlled by having at least one of the tool mount and the workpiece mount movable relative to the other. Thus, either the workpiece mount, the tool mount or both may be moveable in a direction having a substantial component perpendicular to the axis or spindle about which the workpiece is rotated. In particular, the workpiece mount may be rotatable about an axis substantially perpendicular to the workpiece axis of rotation to effect small changes in the angle for such axis of rotation.

At least two tools can be provided, each for performing a different selected operation on the workpiece, with all the tools fixedly supported on the same tool mount, the tool and workpiece mounts being moveable relative to each other to control the one of the tools which is adjacent to and is operating on the workpiece surface. The tool mount may for example include a pivot arm having a first tool mounted adjacent a first end and thereof and a second tool mounted adjacent the opposite end thereof, with a pivot for the arm between the ends to which the tools are mounted. The workpiece mount and/or the tool mount is movable relative to the other in a direction having a substantial component parallel to the arm to control the tool which is adjacent the workpiece surface. Where the operation performed by the tool is a shaping operation, one of the tools may be a roughing tool and another of the tools a finishing tool. Alternatively, one of the tools may operate on a first exposed workpiece surface and the second tool operate on a second exposed workpiece surface; the tool mount and the workpiece mount for this embodiment being moveable relative to each other to bring the appropriate one of the tools adjacent the portion of the corresponding surface to be operated on at a given time.

The tool mount is preferably designed so as to provide a substantially stiff path to ground. For preferred embodiments, the tool mount includes a pivot assembly having the tool mounted near one end thereof and a pivot for the assembly which is substantially spaced along the assembly from the end where the tool is mounted. The assembly is designed to have minimal mass along the length thereof between the tool and the pivot. For these embodiments, the transducer operates on the pivot to affect the parameter of the tool in the direction of the perpendicular component. Where the tool is a shaping tool, the transducer is a drive transducer which operates in response to the indicator of rotational position for controlling tool position in the direction perpendicular to the component as a function of rotational position. Where the tool is a polishing tool, the transducer monitors tool position in the direction of the perpendicular component and controls pressure applied through the arm assembly to the tool to maintain the pressure applied to the surface by the tool substantially constant. The same is true where the tool is a probe used for example to measure depth of a cut on the workpiece surface.

The pivot assembly for some embodiments has a second end spaced along the assembly from the pivot and on the opposite side of the pivot from the tool, with a probe mounted adjacent the second end and a component coacting with the probe to perform a selected function. Where the tool is a shaping tool, the component may be a master lap having a shape which is the inverse of the shape to be formed on the workpiece surface, the apparatus including a mechanism for rotating the master lap in synchronism with rotation of the workpiece. Alternatively, the component may be a linear displacement transducer which coacts with the probe to provide an indication of tool position in the direction of the perpendicular component.

The tool mount or coupling may also include a damper for damping at least selected translational, rotary and/or oscillatory movements of the tool. The damper may for example include a fixed stationery element and a fluid coupling between such element and the pivot assembly, with the element and pivot assembly being relatively oriented so that pivoting of the assembly results in small/shear damping by the fluid coupling, while translational movements of the pivot assembly result in high/squeeze damping by the fluid coupling. Alternatively, the pivot assembly may include a cantilever arm having the tool mounted at the distal end thereof, the arm having a core with a spaced outer shell and the damper including visco-elastic material such as a fluid in the space between the core and outer shell. Such a material may also be interposed in the coupling between the cantilever arm and the drive for the arm, or more generally, in the coupling between the tool and the transducer.

The indicator of workpiece rotational position may include a metrology arm mounted to move with the pivot assembly, but not carrying a tool load, and a rotary position sensor responsive to the metrology arm. Where the pivot assembly rotates about the pivot to move the tool in the desired direction, an indicator of tool position may also be provided, such indicator being for example a capacitor sensor. Where the tool is a shaping tool, the transducer includes a drive for moving or rotating the pivot assembly so as to control the position of the tool in the desired direction. A counterweight may also be provided on the pivot assembly to provide dynamic balancing thereof. A sensor may also be provided for load induced deflections of the pivot assembly, and a feedback control may be provided for the transducer which modifies the transducers effect on the parameter of the tool in response to the deflection sensor.

Foregoing and other objects, features and advantages of the invention will be apparent from the following more particular description of preferred embodiments as illustrated in the accompanying drawings.

IN THE DRAWINGS

Figure 1:
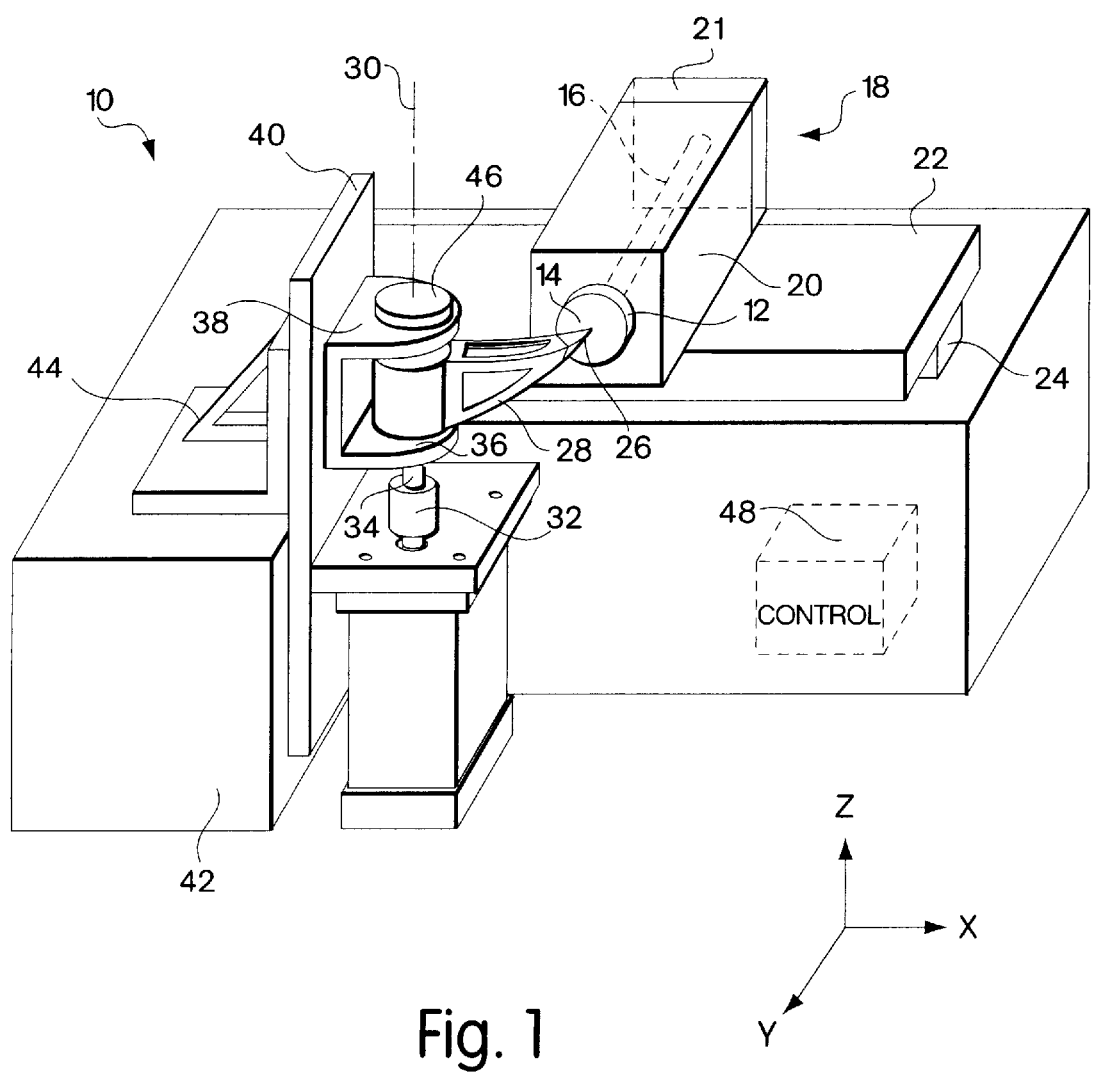
FIG. 1 is a top-front perspective view of apparatus for a first embodiment of the invention.
Figure 4:
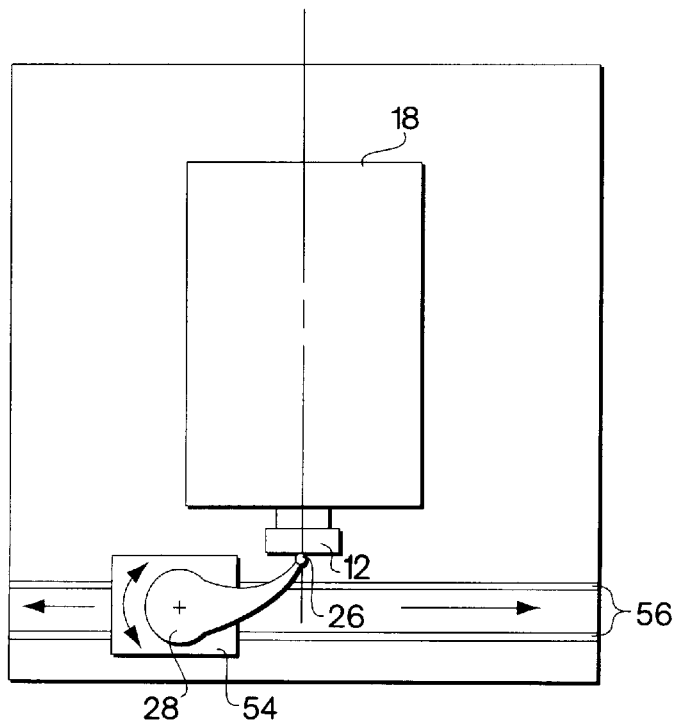
Figure 5:
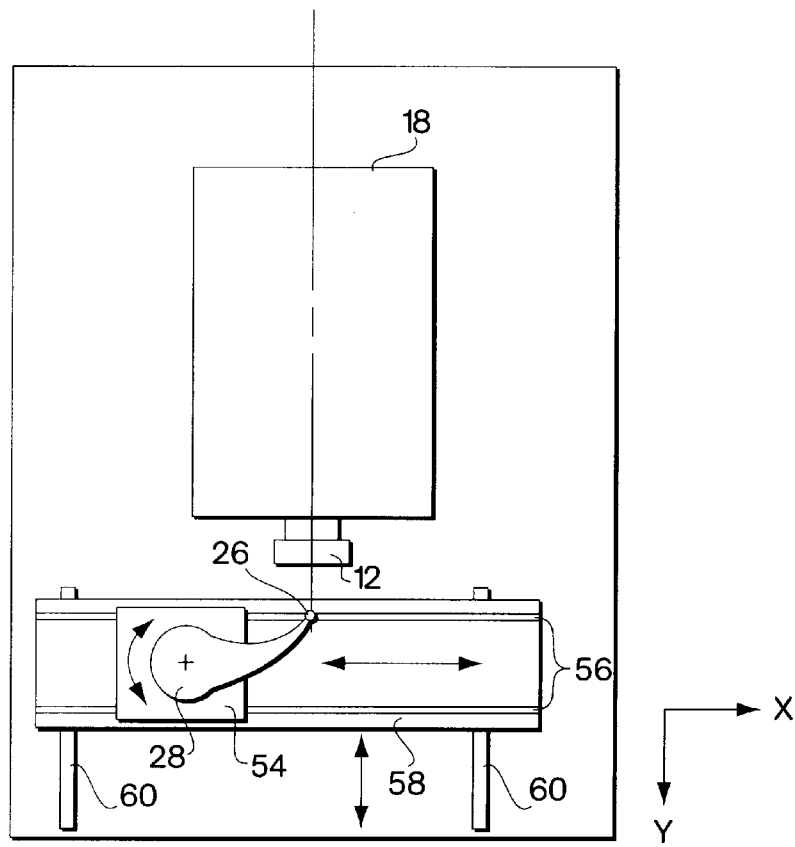
Figure 6:
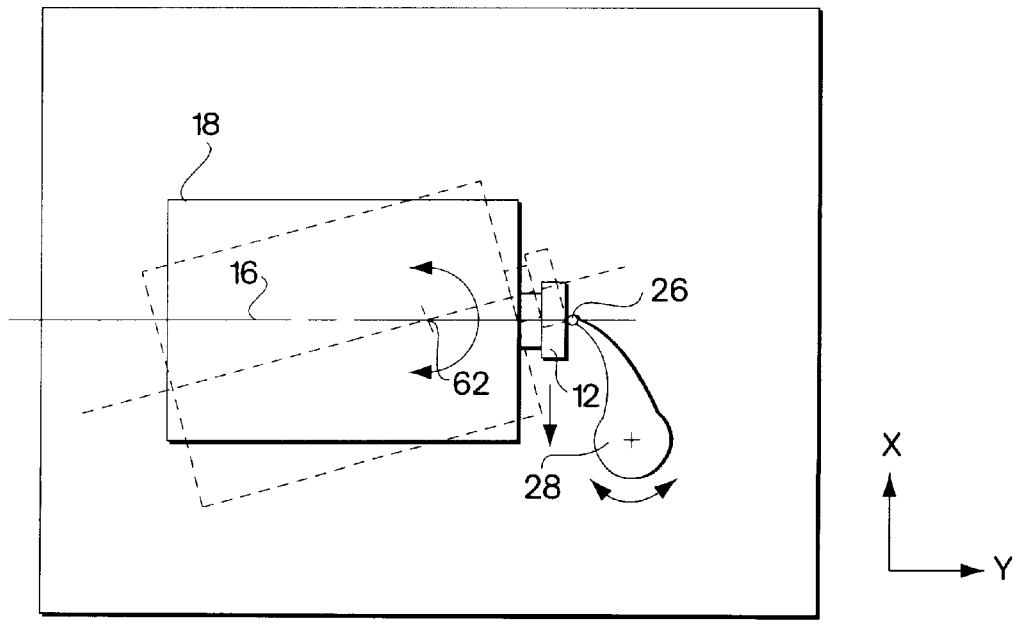

FIGS. 4, 5, and 6 are top views of three further modified forms for the embodiment shown in FIG. 1.

Figure 7:
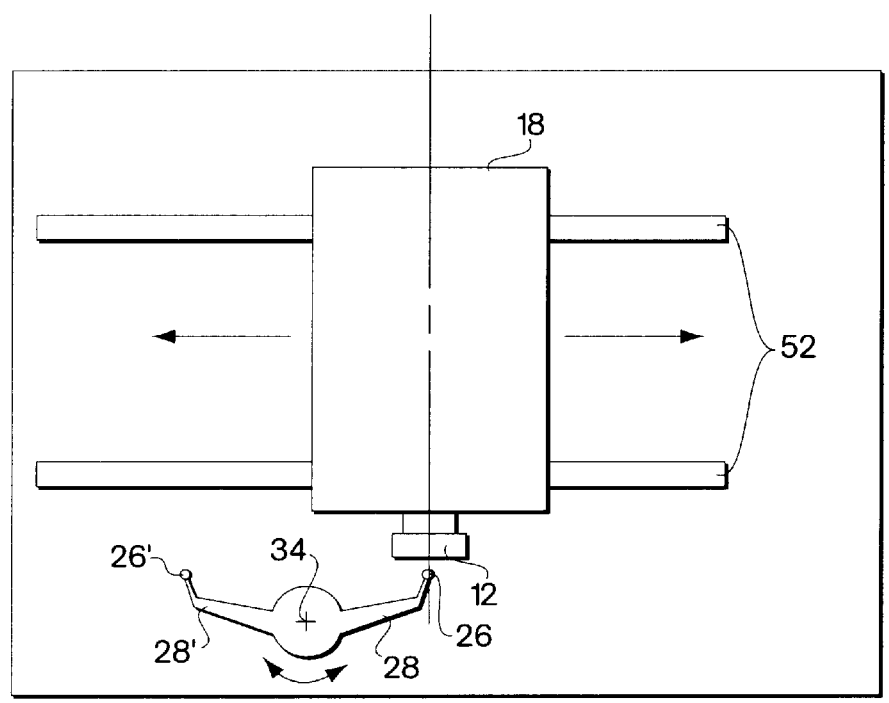

FIG. 7 is a top view of an alternative form of the embodiment shown in FIG. 1, wherein three tools are provided on the pivot arm assembly.

Figures 8A, 8B:
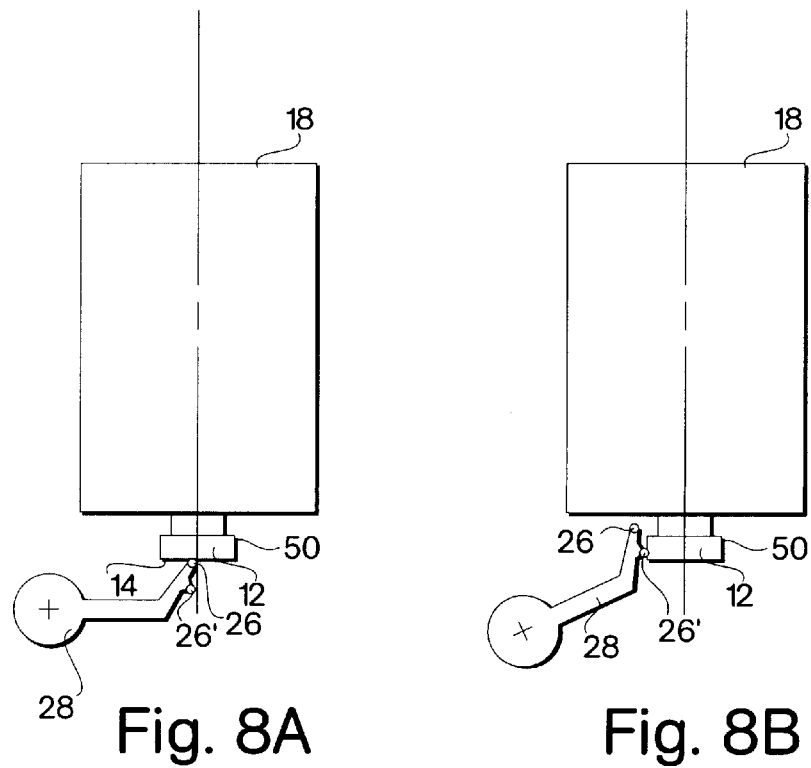

FIGS. 8A and 8B are partial top views for an embodiment of the invention having two tools which operate on a face and an edge of the workpiece as shown in FIGS. 8A and 8B respectively.

Figure 9:
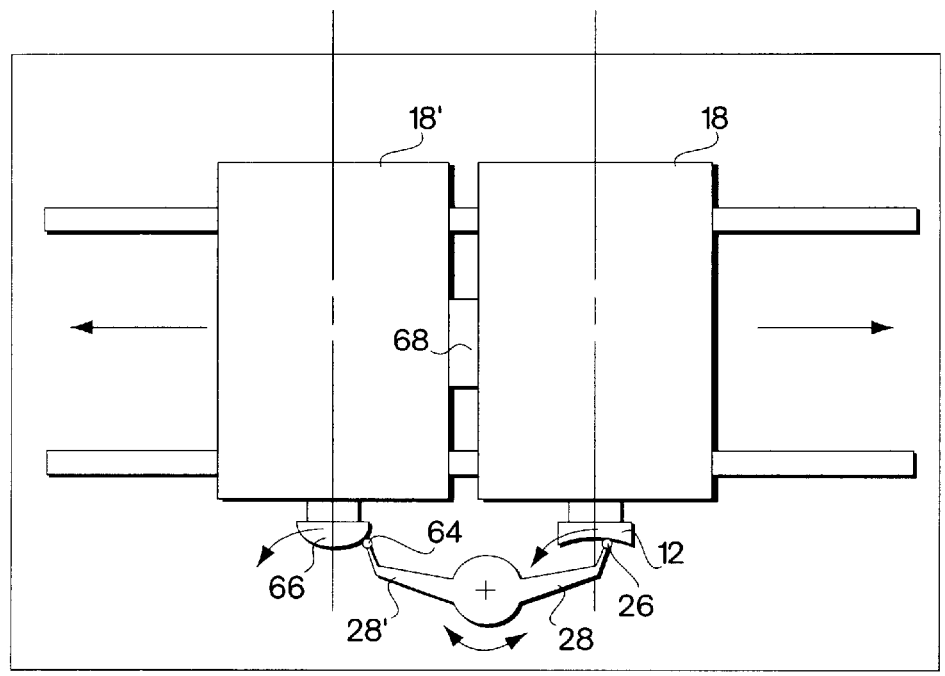

FIG. 9 is a top view for an embodiment of the invention of the type shown in FIG. 1 wherein tool position is controlled by a master lap having a shape complementary to that of the desired workpiece shape.

Figure 10:
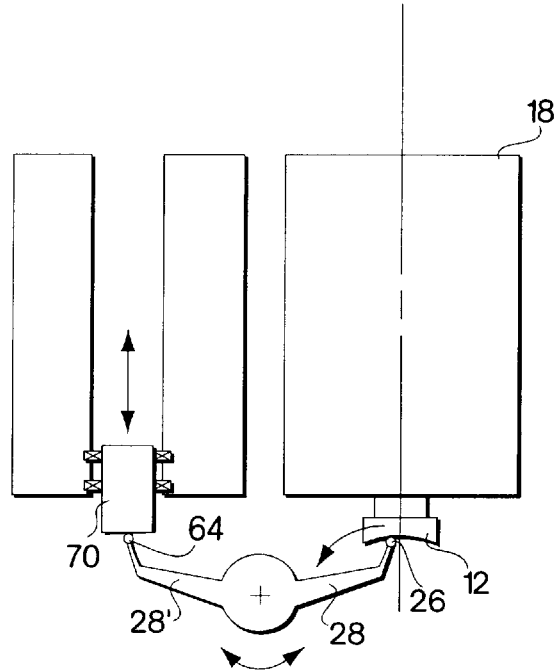

FIG. 10 is a partial top view for an embodiment of the invention wherein an extension of the tool mount pivot arm is used to control a displacement transducer.

Figure 11A:
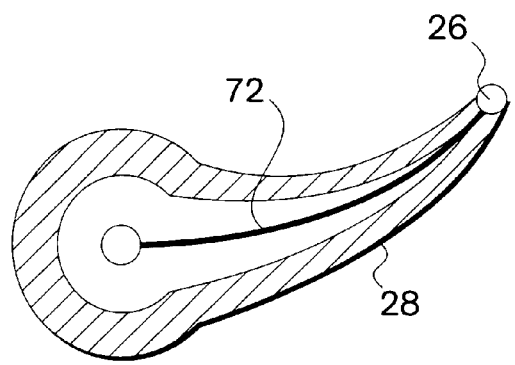
Figure 11B:
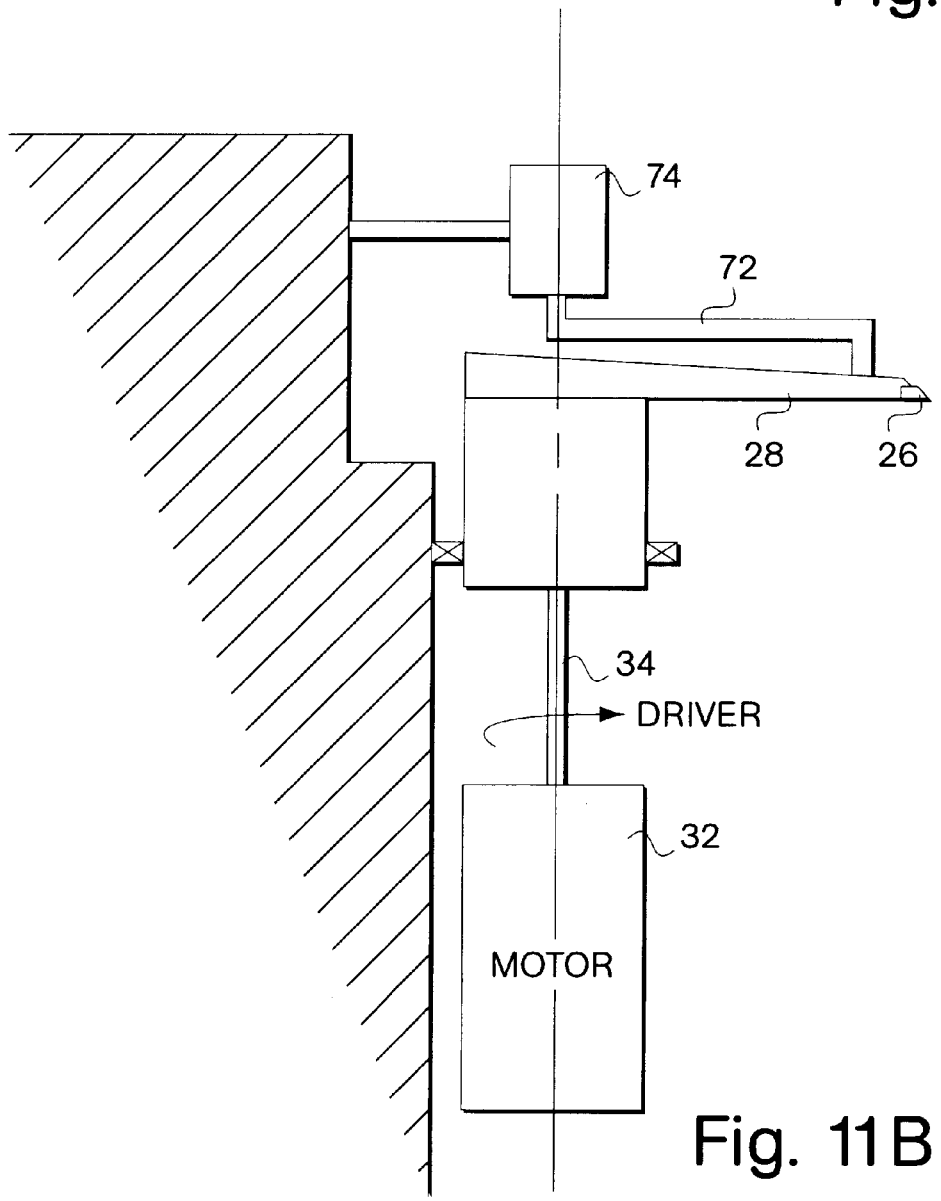

FIGS. 11A and 11B are a top view and a side view respectively for an embodiment of the invention having a metrology arm to detect the tool position.

Figure 12:
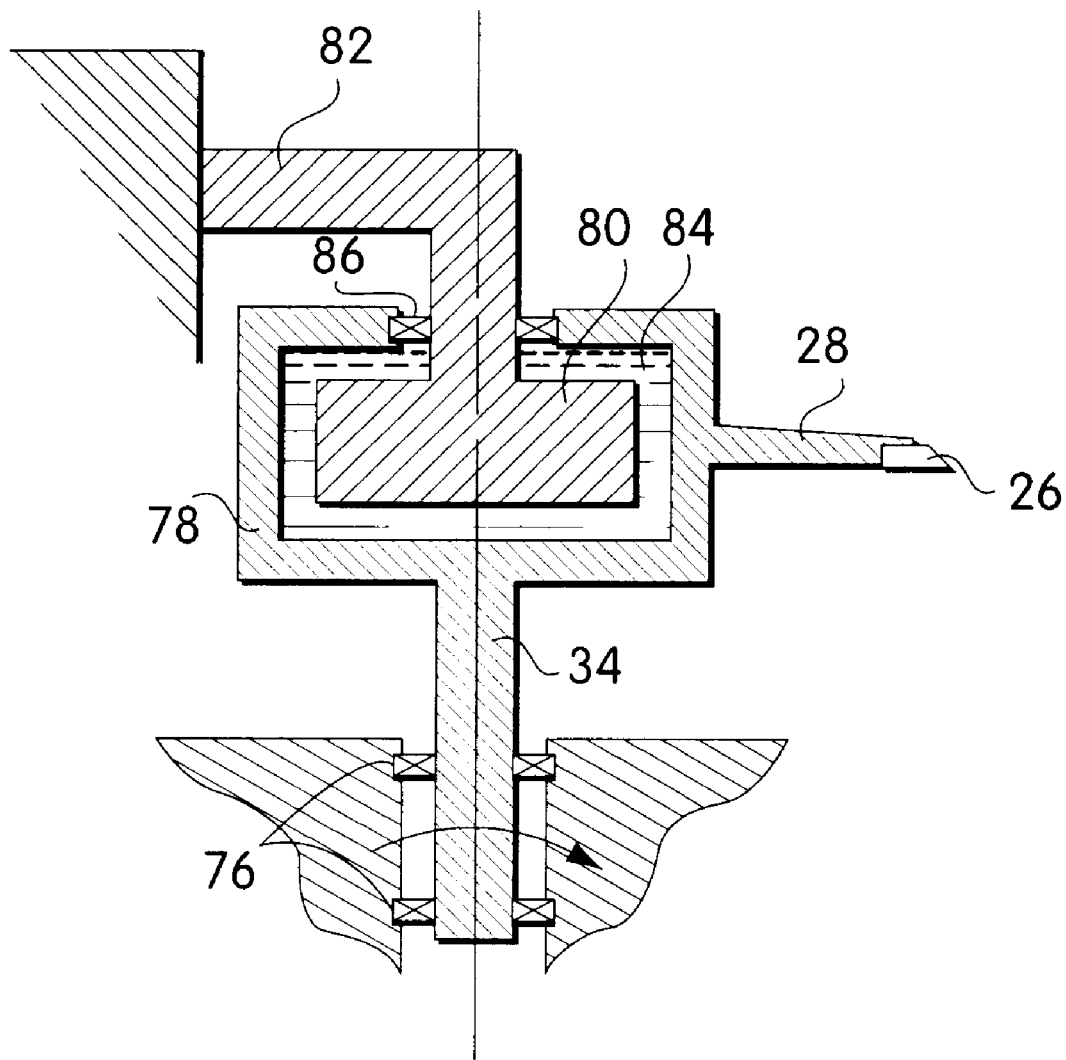

FIG. 12 is a cutaway side view for an embodiment of the invention having a damper for inhibiting unwanted translational movements of the arm.

Figure 13:
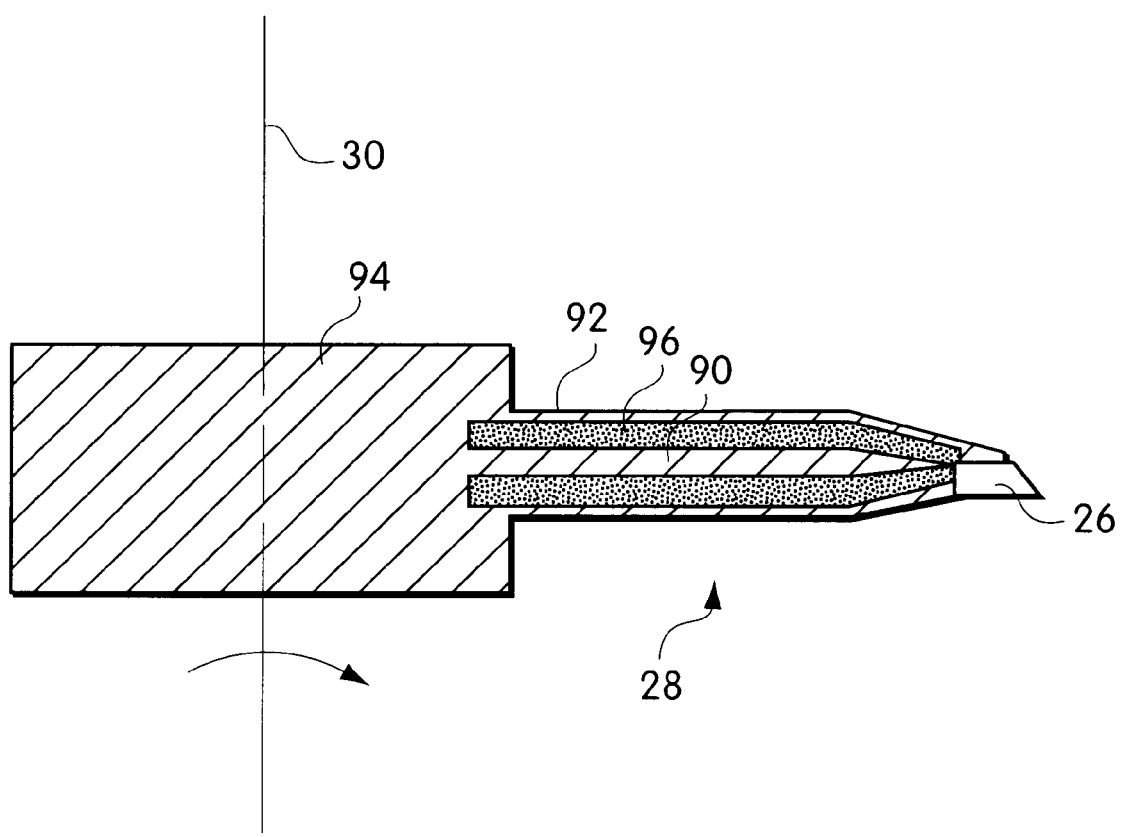

FIG. 13 is a side sectional view of a pivot arm illustrating an alternative damping structure.

Figure 14A:
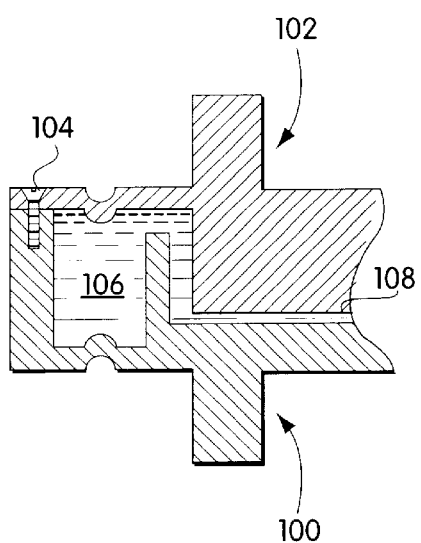
Figure 14B:
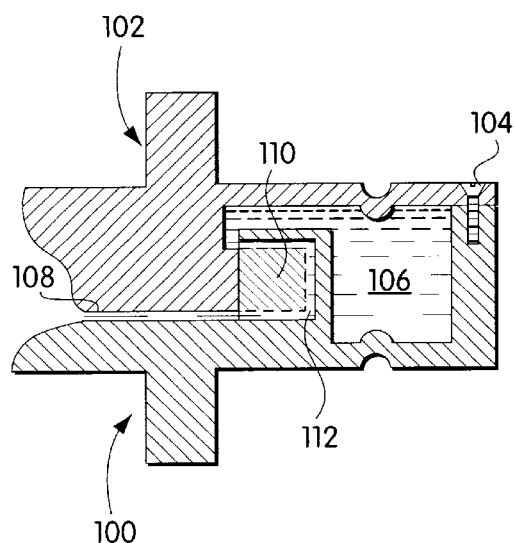

FIGS. 14A and 14B is a side sectional views for two embodiments of a damping coupler for the arm.

DETAILED DESCRIPTION

Referring first to FIG. 1, an apparatus 10 is shown for performing a selected operation on a workpiece 12. As discussed earlier, workpiece 12 may be an ophthalmic lenses or other optical component or may be some other component requiring selected operations on a non-rotationally symmetric surface or face 14 of the workpiece. Workpiece 12 is mounted in a suitable way known in the art, for example by a vacuum workpiece holder or by suitable clamp, to a shaft or spindle 16 of a workpiece assembly 18. Workpiece assembly 18 includes a motor 20 for rotating shaft 16 at a controlled rate, which rate may be uniform or may be varied under process control depending on various factors to be discussed later. In addition to motor 20, workpiece assembly 18 also includes a rotary position sensor 21 for shaft 16, which effectively indicates the instantaneous angular position of workpiece 12, and a carriage 22 to which motor 20 is secured, which carriage may be moved in the lateral or x direction along standard linear guides 19 under control of a linear motor 24. Air bearings, or other suitable bearings, (for example, hydrostatic, rolling element or magnetic) are provided, for example, in the guides 19. Rotary position sensor 21 may for example be an optical encoder. Position is sensed in the x-axis with a standard linear encoder 23.

A tool 26 for operating on surface 14 is mounted at the distal end of a cantilever arm 28, the proximal end of which is attached to be rotated about an axis 30 by a drive motor 32. To maximize stiffness of arm 28 while minimizing its mass/inertia, the arm is in the form of a triangulated structure which tapers near the distal end of the arm. This objective may also be achieved with other similar designs known in the art. Drive motor 32 controls the rotary position of a shaft 34 to which the proximal end of arm 28 is attached. Shaft 34 is supported in a pair of bearings 36 in a bracket 38 which is rigidly mounted through a plate 40 to a ground housing 42. In order to minimize vibration of arm 28, and thus of tool 26, it is desirable that the mounting of the arm/tool to housing 42 be as stiff as possible, brace 44 being provided in FIG. 1 to further stiffen the tool mount. A sensor 46, (for example a capacitive rotary position sensor, an encoder or potentiometer is provided to produce an electrical signal indicative of the rotary position of shaft 34, and thus the depth of tool 26 relative to workpiece surface 14. A controller 48 is also provided which may, for example, be a general purpose processor programmed to perform the control function or a special purpose processor. Outputs from sensors 21 and 46 are fed to controller 48, and in response to such inputs and to stored information previously applied to the controller, such as for example the desired shape for surface 14 of workpiece 12 or other functions to be performed, controller 48 controls the operation of motor 20 to rotate workpiece 12, and also controls the operation of motor 32 to rotate or pivot arm 28 to a selected angular position, and thus to control the depth of tool 26 in surface 14 and/or to control the pressure applied by tool 26 to surface 14. As indicated above, arm 28 is designed to be of minimum mass and, except for tool 26, there is no component having significant mass mounted on arm 28 to be moved thereby. Therefore, the pivot assembly has minimal inertia and the tool may therefore be moved by motor 32 with very high accelerations, in the 100 g range for preferred embodiments, so as to permit very rapid movement of tool 26 in the y direction over distances approaching 1 cm and more.

Assuming the tool of FIG. 1 is to be used for shaping the surface 14 into for example a nonrotationally symmetric ophthalmic lens, tool 26 would be a shaping or cutting tool such as a steel tip or carbide tip, but is preferably a diamond tip. When such a tip is used, the operation may be referred to as a single point turning operation. The first step in such a shaping operation is to operate linear motor 24 to bring a selected radius of the workpiece surface 14 adjacent tool 26. Either before or after this is done, motor 20 is operated to start rotating workpiece 14 at a selected rpm. It is contemplated that, utilizing the teachings of this invention, it will be possible to move tool 26 with an acceleration, for example 100 g, such that workpiece rotation in the 1500–6000 rpm range are possible while still being able to produce lenses having non-rotationally symmetric features with depth variations of up to one centimeter. The rate at which the workpiece is rotated may be constant, but is preferably varied so as to be optimized for the conditions of a given cut, such as the radius for the cut and the depth variations for the cut. Thus, if for a given workpiece, some cuts had substantial variations in surface depth, while there was only minor variations in surface depth for other cuts, the workpiece could be rotated at a higher rate for the latter cuts.

The next step in the operation is to operate motor 32 to rotate arm 26 in a counterclockwise direction to bring tool 26 into contact with surface 14. The force applied through arm 28 to tool 26, and thus the depth of cut at each point on surface 14 is controlled by controller 48 in response to indications received from position sensors 21 and 23 as to the position of workpiece surface 14, controller 48 applying controls to motor 32 in response thereto. The output from sensor 46 is also applied to controller 48 so that the control can determine the actual position of tool 26 and thus the depth of cut at each point, and compare this against the desired depth of cut. This information is also used to control motor 32 to affect both the existence of shaping and the extent of the shaping at each point along the surface being shaped. When controller 48 determines that shaping for the current position of tool 26 relative to surface 14 has been completed, motor 24 is actuated by controller 48 to move workpiece 12 so as to bring the tool 26 adjacent a new portion of the workpiece, and the process is repeated to shape a new circular portion of the workpiece. This sequence of operations is repeated until the entire workpiece has been shaped. When control 48 determines that shaping on a given workpiece has been completed, the workpiece is removed, either manually or automatically, and a new workpiece, for example a new ophthalmic lens, is positioned on mount 18 to be shaped.

In addition to performing shaping, the apparatus of FIG. 1 may also be utilized to perform other functions, such as polishing or probing/measuring. For polishing, a suitable tool, for example a felt pad or fine sandpaper, is mounted at the distal end of arm 28. Movement of arm 28 as tool 26 is moved over the uneven surface 14 of the workpiece is detected by sensor 46, and an indication of these positional changes is fed to controller 48, which, using known algorithlns, then applies control signals to motor 32 so as to maintain a constant pressure for polishing tool 26 against surface 14, regardless of surface depth for surface 14. Similarly, if tool 26 is a probe, for example a ruby ball with a known radius, the output from sensor 46 would provide an indication to control 48 of surface depth at each angular position on the surface as indicated by sensor 21, and this information would also be used in the same manner as for the polishing operation to maintain substantially constant pressure by tool 26 against surface 14. Other tools might also be utilized in appropriate applications.

Figure 2:
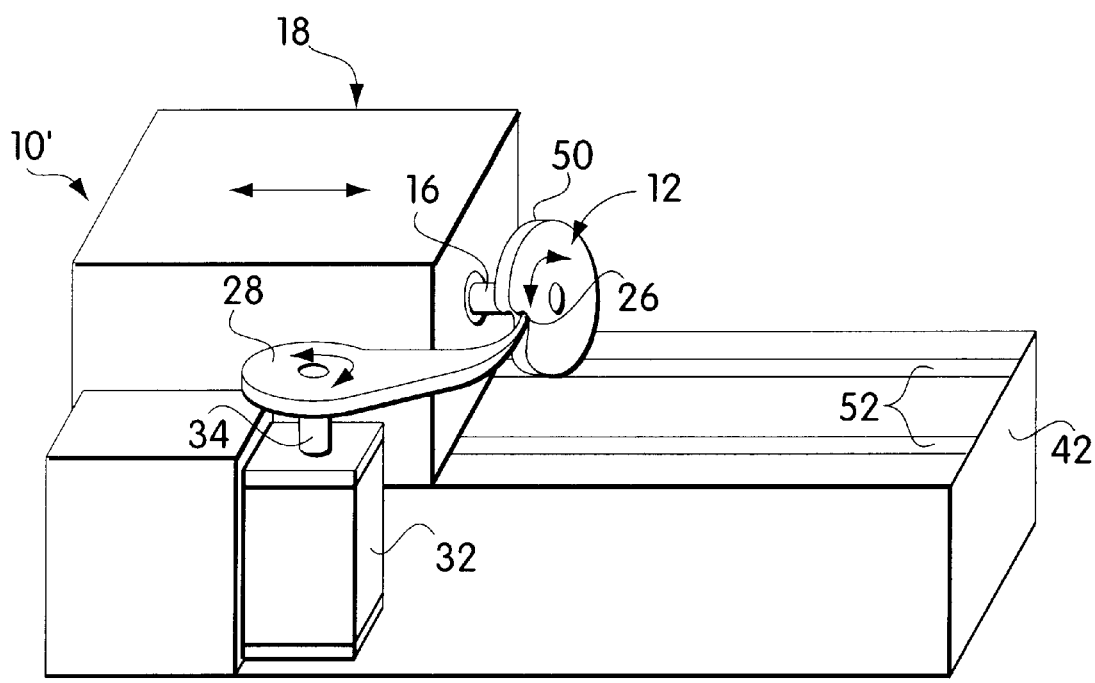
FIG. 2 is a top-front perspective view of apparatus for an alternative embodiment of the invention which operates on an edge surface of the workpiece.
Figure 2:
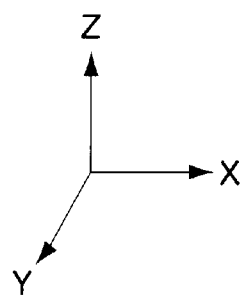

FIG. 2 shows an alternative embodiment 10' of the invention wherein the workpiece mount 18 and tool mount 28 are positioned relative to each other such that tool 26 makes contact with an edge 50 of workpiece 12 rather than with a face surface 14. The workpiece 12 in this instance may for example be an asymmetric cam or a non-cylindrical piston. For this embodiment, workpiece mount 18 also includes part of a linear motor, the other part of which is mounted on base housing or support 42, the linear motor causing workpiece mount assembly 18 to be moved in the x direction along tracks 52. Moving mount 18 in the x direction controls the height on surface 50 at which shaping occurs as workpiece 12 is rotated. Thus, not only could workpiece 12 have rotationally non-symmetric edge, but the depth of cut also need not be uniform for all height positions along this edge. While a simplified arm structure and a simplified mounting structure for the tool 26 are shown in FIG. 2, this is primarily for simplicity of illustration, and the arm/mounting structures would preferably be similar to those shown in FIG. 1. FIG. 2 also illustrates a counterweight 51 attached to arm 28 on the opposite side of tool 26. This moves the center of mass of arm 28 (and ideally the principal axis of inertia) in line with axis of rotation 30, thereby reducing, or eliminating, reaction forces transmitted to the arm supports. Except as indicated above, the embodiments of FIGS. 1 and 2 are substantially the same and operate in substantially the same manner to perform shaping or to perform other operations such as polishing or measuring.

Figure 3:
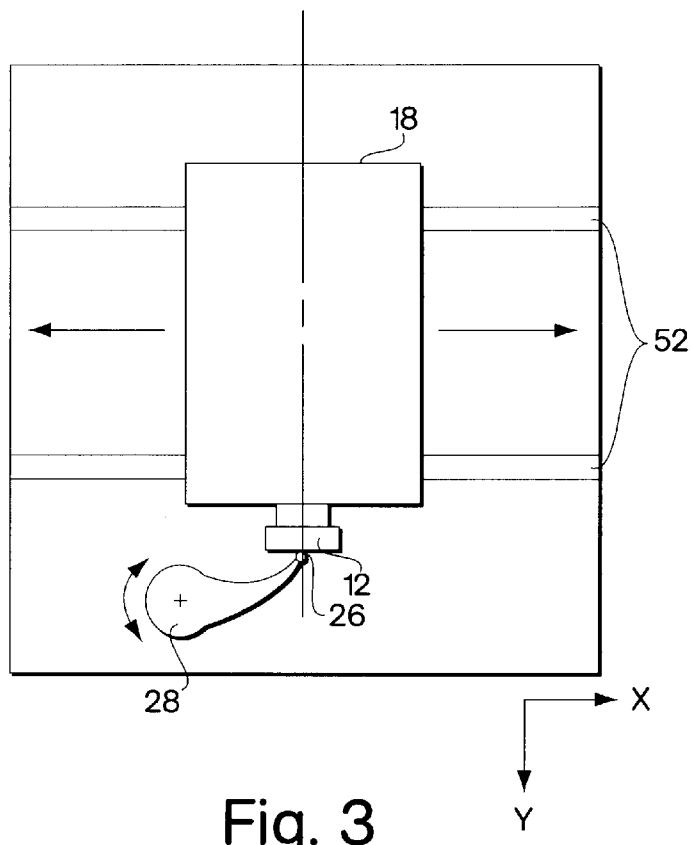
FIG. 3 is a top view for a slightly modified form of the embodiment shown in FIG. 1.

FIG. 3 is a top-view of an embodiment such as that shown in FIG. 1 which differs from the embodiment of FIG. 1 primarily in that it utilizes the track structure 52 and linear motor of assembly 18 as shown in FIG. 2 rather than the carriage 22 for moving the workpiece in the x direction. FIG. 4 shows an alternative embodiment wherein rather than workpiece 12 being moved in the x direction, tool 26 is moved in the x direction to reposition the portion of workpiece surface 14 being operated on by tool 26. In this case, tool mount assembly 54 contains the linear motor elements and is moved in the x direction along tracks 56 to reposition tool 26. The embodiment of FIGS. 1 and 3 is considered preferable to that of FIG. 4 since it provides a far stiffer mount to ground, and therefore better vibration resistance than the embodiment of FIG. 4. FIG. 5 illustrates still another embodiment which differs from the embodiment of FIG. 4 in that tool mount assembly 54 and tracks 56 are mounted to a plate 58 which in turn is movable in the y direction under the action of a linear motor (not shown) mounted at least partly to plate 58. While this embodiment has the advantage of permitting low speed gross movements of the tool. along tracks 60 in addition to the high speed fine movements provided by motor 32 rotating arm 28, it is not a preferred embodiment since it provides a mount for tool 26 having poor stiffness-to-ground characteristics and is therefore more subject to vibration problems than the other embodiments. If low-speed gross movements are required, it is preferable that these movements be provided by movement of workpiece assembly 18 or of shaft 16 within this assembly. FIG. 2 illustrates one way in which movement of the workpiece assembly in the x direction may be accomplished. However, in most instances, unless operations are being performed on edge 50, such gross movement should not be required, and the movements of tool 26 caused by the rotation of arm 28 by motor 32 should be adequate to provide all required movements in the y direction. An alternative process which may be used when greater movements are required is discussed later in conjunction with FIG. 7.

FIG. 6 shows still another embodiment of the invention which is advantageous in that it provides a stiff mounting for both the tool and workpiece, but is disadvantageous in that it requires a much more complicated algorithm for at least motor 32. However, a control processor 48 can easily be programmed using known algorithms so as to provide the necessary controls for this embodiment. In particular, for this embodiment of the invention, rather than either the workpiece mount assembly 18 or the tool mount assembly 54 being moved in the x direction to reposition the portion of surface 14 being operated on by tool 26, assembly 18 is rotated about an axis 62 by a suitable motor (not shown), under control of control 48, to effect such repositioning. Since when axis 16 of the workpiece is at an angle to the y direction, the angle of this axis needs to be taken into account in determining depth of cut, the controls for this embodiment are more complicated but, as indicated earlier, easily accomplished.

FIG. 7 shows still another alternate embodiment of the invention which differs from that shown in for example FIGS. 1 and 3 in that, instead of the tool mount assembly having a single arm 28 with a tool 26 at the end thereof, the tool assembly also has a second and third arm 28', 28" extending in different directions than arm 28 from pivot shaft 34, with a tool 26', 26" at the end of arms 28', 28" respectively. For one embodiment of the invention where apparatus 10 is being utilized for shaping workpiece 12, tool 26' could be a roughing tool, tool 26 a finishing tool and tool 26" a measuring probe. Arms 28, 28' and 28" can be of equal length, or one arm can be longer than the other to provide for greater movement of the corresponding tool in the y direction. Thus, arm 28 may be longer than arm 28' to permit the finishing tool to move to a greater depth than the roughing tool. It is also possible for tool 26 to be a shaping tool and tool 26' to be a polishing or probe/measuring tool. Assembly 18 is moved along tracks 52 in the manner previously described in the x direction to bring the appropriate tool 28, 28' adjacent to workpiece 12 and to control the portion of the workpiece being operated on at any given time. Tool 28" can be moved into position by for example moving workpiece mount 18 out of the way, and then rotating the arm assembly 120° counterclockwise. In suitable applications, more or less arms/tools may be present or the arm assembly. Further, the angular spacing between arms may be uniform as shown, or may be nonuniform.

FIGS. 8A and 8B illustrate another embodiment of the invention wherein there are two tools mounted at the end of arm 28, one of which tools, tool 26, is utilized for shaping face surface 14 of workpiece 50, and the other of which, tool 26', is utilized for shaping edge surface 50 of the workpiece. Thus, with a single mounting of the workpiece, a complete ophthalmic lens can be formed. The tools are angled at the end of arm 28 so as to be properly positioned for operating on their respective surfaces, and movement in the x direction is provided in the manner previously indicated to bring the appropriate tool adjacent to the surface to be operated on at any given time. With proper design, other suitable tools could be mounted at the end of arm 28 to operate on different surfaces as shown in the Figure, or to operate differently on the same surface. Further, while two tools have been shown mounted to the assembly in FIGS. 7 and 8, this is not a limitation on the invention, and in suitable applications, more than two tools might be provided. While two or more tools at the end of arm 28 increases the inertia of the pivot assembly, and therefore reduce its acceleration, there are applications where the advantages of this design are sufficient so as to render this penalty acceptable.

FIG. 9 illustrates still another embodiment of the invention wherein the tool assembly has two arms 28 and 28' as for the embodiment of FIG. 7, with the tool 26 at the end of arm 28 operating to shape a workpiece 12 in the manner previously described. However, instead of motor 32 controlling the pivoting of arm 28 under control of controller 48, arm 28' has a probe 64 at its end which coacts with a lap 66 having a shape which is the inverse of the desired shape for the surface 14 of workpiece 12 to control the y direction of tool 26. Lap 66 is rotated by an assembly 18' in synchronism with the rotation of workpiece 12 and assembly 18' is joined by a junction 68 to assembly 18 to move in the x direction therewith. The embodiment of FIG. 9 is not preferred since it requires the use of laps 66, with all of the expense and disadvantages thereof; however, it does permit very high spindle speeds.

FIG. 10 shows an alternative embodiment to FIG. 9 wherein instead of lap 66, probe tip 64 drives a linear position sensor (LVDT) or displacement transducer 70, movement of arm 28 and 28' being controlled by the motor 32 as for prior embodiments. This is an alternative to capacitive sensor 46 for detecting the y-direction position of tool 26.

FIGS. 11A and 11B illustrate an embodiment wherein rotary position sensor 46 is replaced by a metrology arm 72 mounted to move with arm 28 and a rotary sensor 74 for detecting and generating an output based on the position of the metrology arm. This arrangement separates the element carrying the cutting load, arm 28, from the sensing of angular position. Thus deflection of the cutting arm based on the cutting load does not result in potential errors in the detection of angular position.

FIG. 12 illustrates an embodiment for dealing with still another potential problem, that of arm vibration. Where depth control in the micron range is required, vibration is a potential problem which makes control to achieve desired tolerances more difficult; while if depth control in the nanometer range is desired, control of vibration is essential in order to achieve the desired precision.

A fluid damper, or other suitable damper, can therefore be provided to reduce arm vibration, the damper, for example, being incorporated directly into the arm 28 or forming part of the bearing used to mount the arm. FIG. 12 illustrates the latter situation where shaft 34 (which is rotated by motor 32) passes through a pair of bearings 76 and terminates in a cup-shaped structure 78 from which arm 28 extends. A plate 80 mounted to ground through a shaft 82 sits in structure 78 and is spaced from the walls thereof by damping fluid 84. Shaft 82 exits structure 78 through bearings 86. With the structure shown in FIG. 12, moderate shear damping is provided for rotary motions which are the desired motions of arm 28, while high squeeze-film damping occurs for unwanted translational movements of arm 28 in the x, y or z direction.

FIG. 13 illustrates another form of passive damping which damps "springboard" vibration of the tool. For this embodiment, the arm 28 has both a core 90 and a shell 92 which extend from its base 94; between the core and shell there is an opening containing damping material 96, which may be a fluid, but is preferably double sided sticky tape or similar material. Material 96 damps vibrations in the z direction of shell 92 to which tool 26 is connected.

FIGS. 14A and 14B illustrate still another configurations for damping vibration, and in particular potential vibration between motor 32 and arm 28 which, absent damping, can resonate so that the arm may actually be moving in a different direction than the motor. Referring first to FIG. 14A, a clamp assembly 100 is shown which attaches to motor 32, and a clamp assembly 102 is shown which attaches to arm 28. The clamp assemblies are held together at their ends by screws 104. In FIG. 14A there is a chamber 106, between the clamp assemblies which extends to a thin region 108 between the main portions of the assemblies. Chamber 106 including portion 108, thereof is filled with a viscous fluid which provides vertical damping between the two segments; however, since a viscous fluid does not provide significant shear resistance, the configuration in FIG. 14A does not provide significant damping for rotational movement or oscillation. The embodiment of FIG. 14B differs from that of FIG. 14A in that assembly 102 has a plurality of teeth 110 (only one of which is shown in the Figure) each of which fits in a chamber 112 formed in assembly 100 which portion is also filled with a viscous fluid, the viscous fluid surrounding each tooth 110. Rotational movement between the two clamp assemblies therefore results in squeeze-film damping which is effective to substantially inhibit rotational oscillation. While three forms of damping are shown in FIGS. 12, 13 and 14, it is apparent that other forms of damping could also be used to reduce vibration and other spurious movement of arm 28.

Another potential problem for the turning machines of this invention is that, notwithstanding efforts to make arm 28 as stiff as possible, there will be some bending or deflection of this arm when large forces are being applied by the arm and tool to a workpiece. At the levels of accuracy previously discussed, such deflections can present an unacceptable source of error. One solution to this problem is to provide a detector for such deflection, for example a strain gauge mounted in the arm 28 to obtain an indication of bending. This information can then be fed back to controller 48 to cause sufficient additional movement of the arm, and of the tool mounted at the end thereof, so as to compensate for bending of the arm and to move the tip to the precise required location. Where the tool is being used to monitor or measure surface features, bending of the arm can be taken into account in making the final determination on measured values.

There are existing repetitive control algorithms which track repetitive errors under selected conditions, for example frequency, and which provide active control to compensate for such repetitive errors. Such algorithms can be applied in connection with this invention to detect repetitive errors and to provide additional stiffness or other appropriate compensations to compensate for such errors.

Further, while a low inertia mount for tool 26 has been shown as a pivot arm 28 for the preferred embodiments, and this is the currently preferred form of the invention, this is not a limitation on the invention, and with suitable modifications in design, other types of low inertia mounts might be usable, such as a diaphragm or a flexure arm.

Therefore, while the invention has been particularly shown and described above with reference to preferred embodiments, the foregoing and other changes in form and detail may be made therein by those skilled in the art without departing from the spirit and scope of the invention as indicated in the appended claims.

What is claimed:

1. Apparatus for performing a selected operation on a workpiece comprising:
   a workpiece mount, said mount leaving at least one surface of said workpiece exposed to be operated on;
   a mechanism for operating said mount to rotate the workpiece at a controlled high revolution rate;
   an indicator of workpiece rotational position;
   a tool adapted to performing said selected operation;
   a tool mount fixedly supporting said tool, said mount positioning the tool adjacent a portion of said at least one surface which is to be operated on, said mount having a rotatable portion which is movable with said tool in a direction having a component perpendicular to said at least one surface, said portion of the mount having a weight and having an inertia to movement of the tool in said direction which are substantially minimized consistent with stiffness requirements on said mount for said operation so as to permit movement of the tool with a very high acceleration;
   a drive transducer acting through said tool mount to affect at least one of a position and pressure parameter of the tool movement of said mount in the direction of said perpendicular component being greater at substantially said tool than elsewhere on said portion of the mount; and
   a controller for said drive transducer, which controller is responsive at least in part to said indicator.

2. Apparatus as claimed in claim 1 wherein the combination of the tool and said portion of the mount supporting the tool, has a mass which is greater than that of any portion of said mount other than said portion of the mount which is moveable in the direction of said perpendicular component by a distance at least as great as that of said tool.

3. Apparatus as claimed in claim 1 wherein at least one of said tool mount and said workpiece mount is movable relative to the other to alter the portion of said at least one surface at which the tool is adjacent.

4. Apparatus as claimed in claim 3 wherein said workpiece mount is movable in a direction having a substantial component perpendicular to an axis about which said workpiece is rotated.

5. Apparatus as claimed in claim 3 wherein the tool mount is movable in a direction having a substantial component perpendicular to an axis about which said workpiece is rotated.

6. Apparatus as claimed in claim 3 wherein said workpiece mount is rotatable to effect small changes in the angle of an axis about which said workpiece is rotated, rotation of the workpiece mount bringing a different portion of the workpiece adjacent the tool.

7. Apparatus as claimed in claim 3 wherein said tool mount is not moved relative to the workpiece mount; and wherein said workpiece mount is moved in a direction having at least a major component in a direction perpendicular to an axis about which the workpiece is rotated to alter the portion of said at least one surface which said tool is adjacent.

8. Apparatus as claimed in claim 3 wherein there are at least two tools, each for performing a different selected operation on said workpiece, which tools are fixedly supported on said mount; and
   wherein at least one of said tool mount and said workpiece mount are moveable relative to the other to control the one of said tools which is adjacent the portion of said at least one surface which is to be operated on.

9. Apparatus as claimed in claim 8 wherein said tool mount includes a pivot arm having a first of said tools mounted adjacent one end thereof and a second of said tools mounted adjacent an opposite end thereof, there being a pivot for said arm between the ends thereof at which said tools are mounted; and
   wherein at least one of said tool and workpiece mounts is movable relative to the other in a direction having a substantial component parallel to said arm to control the tool which is adjacent the surface of the workpiece to be operated on.

10. Apparatus as claimed in claim 8 wherein said operation is a shaping operation, and wherein one of said tools is a roughing tool and another of said tools is a finishing tool.

11. Apparatus as claimed in claim 8 wherein one of said tools operates on a first exposed workpiece surface and the second tool operates on a second exposed workpiece surface, and wherein said tool mount and said workpiece mount are movable relative to each other to bring the appropriate one of said tools adjacent the portion of the corresponding surface to be operated on at a given time.

12. Apparatus as claimed in claim 1 wherein said tool mount provides a substantially stiff path to ground.

13. Apparatus as claimed in claim 1 wherein said tool mount includes a pivot assembly having said tool mounted near one end thereof and a pivot for the assembly which is substantially spaced along said assembly from the end where the tool is mounted, said assembly, along the length thereof between said tool and said pivot, being said rotatable portion of the mount.

14. Apparatus as claimed in claim 13 wherein said transducer operates on said pivot to affect the parameter of the tool in the direction of said perpendicular component.

15. Apparatus as claimed in claim 14 wherein said tool is a shaping tool, and wherein said transducer is a drive transducer which operates in response to said indicator for controlling tool position in the direction of said perpendicular component as a function of workpiece rotational position.

16. Apparatus as claimed in claim 14 wherein said tool is a polishing tool; and wherein said transducer monitors tool position in the direction of said perpendicular component and controls pressure applied through the pivot assembly to the tool to maintain the pressure applied to the surface by the tool substantially constant.

17. Apparatus as claimed in claim 14 wherein said tool is a probe; and wherein said transducer monitors tool position in the direction of said perpendicular component and controls pressure applied through the pivot assembly to the tool to maintain the pressure applied to the surface by the tool substantially constant.

18. Apparatus as claimed in claim 13 wherein said pivot assembly has a second end spaced along said assembly from said pivot and on the opposite side of said pivot from said tool, a probe mounted adjacent said second end, and a component coacting with said probe to perform a selected function.

19. Apparatus as claimed in claim 18 wherein the tool is a shaping tool and wherein said component is a master lap having a shape which is the inverse of a shape to be formed in said surface to be operated on, and including a mechanism for rotating said master lap in synchronism with the rotation of said workpiece.

20. Apparatus as claimed in claim 18 wherein said component is a linear displacement transducer which coacts with said probe to provide an indication of tool position in the direction of said perpendicular component.

21. Apparatus as claimed in claim 13 wherein said tool mount includes a damper for damping at least selected translational movements of the tool.

22. Apparatus as claimed in claim 21 wherein said damper includes a fixed, stationary element, and a fluid coupling between said element and said pivot assembly, the element and pivot assembly being relatively oriented so that pivoting of said assembly results is small shear damping by said fluid coupling, while translational movements of the pivot assembly will result in high squeeze damping by said fluid coupling.

23. Apparatus as claimed in claim 21 wherein said pivot assembly includes a cantilever arm having said tool mounted at the distal end thereof, said arm having a core with a spaced outer shell, said damper including a visco-elastic material in the space between said core and outer shell.

24. Apparatus as claimed in claim 21 wherein said tool mount is a cantilever arm having the tool mounted at one end thereof, wherein said transducer is a drive to said arm which is coupled to said arm at a point spaced from said tool, and wherein said damper includes visco-elastic material in the coupling between said arm and said drive.

25. Apparatus as claimed in claim 13 wherein said indicator includes a metrology arm mounted to move with said pivot assembly, but not carry a tool load, and a rotary position sensor responsive to said metrology arm.

26. Apparatus as claimed in claim 13 wherein said pivot assembly rotates about said pivot to move said tool in the direction having said perpendicular component, and including an indicator of tool position in said direction.

27. Apparatus as claimed in claim 26 wherein said indicator of tool position is one of a capacitive sensor, an encoder and a potentiometer.

28. Apparatus as claimed in claim 26 wherein said tool is a shaping tool, and wherein said transducer includes a drive for moving the pivot assembly so as to control the position of said tool in said direction.

29. Apparatus as claimed in claim 13 wherein said tool mount is balanced so as to align the principle axis of the tool mount with the pivot assembly axis of rotation.

30. Apparatus as claimed in claim 29 including a counterweight on said pivot assembly to provide dynamic balancing thereof.

31. Apparatus as claimed in claim 12 including a sensor of load induced deflections in said pivot assembly, and including a feedback control for said transducer which modifies the transducers effect on said parameter in response to said sensor.

* * * * *